US009240999B2

(12) United States Patent
Clark et al.

(10) Patent No.: US 9,240,999 B2
(45) Date of Patent: Jan. 19, 2016

(54) MANAGED VIRTUAL POINT TO POINT COMMUNICATION SERVICE HAVING VERIFIED DIRECTORY, SECURE TRANSMISSION AND CONTROLLED DELIVERY

(71) Applicant: DST Technologies, Inc., Kansas City, MO (US)

(72) Inventors: Peter E. Clark, Oakville (CA); Paul M. Ives, Toronto (CA); Michael V. Gentry, Toronto (CA)

(73) Assignee: DST Technologies, Inc., Kansas City, MO (US)

( * ) Notice: Subject to any disclaimer, the term of this patent is extended or adjusted under 35 U.S.C. 154(b) by 0 days.

(21) Appl. No.: 14/450,717

(22) Filed: Aug. 4, 2014

(65) Prior Publication Data

US 2014/0344902 A1 Nov. 20, 2014

Related U.S. Application Data

(63) Continuation of application No. 12/632,477, filed on Dec. 7, 2009, now Pat. No. 8,832,853.

(51) Int. Cl.
*H04L 29/06* (2006.01)
*H04L 9/32* (2006.01)
*H04L 12/58* (2006.01)

(52) U.S. Cl.
CPC *H04L 63/10* (2013.01); *H04L 9/32* (2013.01); *H04L 12/5885* (2013.01); *H04L 51/12* (2013.01); *H04L 51/22* (2013.01); *H04L 2209/56* (2013.01); *H04L 2209/60* (2013.01); *H04L 2209/80* (2013.01)

(58) Field of Classification Search
None
See application file for complete search history.

(56) References Cited

U.S. PATENT DOCUMENTS

| 4,992,649 | A | | 2/1991 | Mampe et al. | |
|---|---|---|---|---|---|
| 5,166,979 | A | * | 11/1992 | Takayama et al. | 726/19 |
| 5,181,255 | A | | 1/1993 | Bloomberg | |
| 5,191,525 | A | | 3/1993 | LeBrun et al. | |
| 5,258,855 | A | | 11/1993 | Lech et al. | |
| 5,369,508 | A | | 11/1994 | Lech et al. | |

(Continued)

OTHER PUBLICATIONS

Andreev, Andrey and Kirov, Nikolay, "Some Variants of Hausdorff Distance for Word Matching," Institute of Mathematics and Informatics, Bulgarian Academy of Sciences, 2008, pp. 3-8.

(Continued)

*Primary Examiner* — Michael R Vaughan
(74) *Attorney, Agent, or Firm* — Lempia Summerfield Katz LLC

(57) ABSTRACT

A system for providing a managed virtual point to point communication service having a verified directory and providing secure transmission and controlled delivery of electronic document images may include a memory, an interface, and a processor. The memory may store a verified directory of users. The interface may communicate with devices of sending and receiving users in the verified directory. The processor may be operative to receive a request to deliver an electronic document image from a sending user to a receiving user. The processor may provide secure access to the electronic document image to the receiving user. The processor may provide a delivery confirmation to the sending device of the sending user upon determining that the electronic document image was securely accessed by the receiving user. The delivery confirmation may indicate that the electronic document image was securely transmitted to the receiving user.

19 Claims, 7 Drawing Sheets

(56) References Cited

U.S. PATENT DOCUMENTS

| | | | |
|---|---|---|---|
| 5,406,385 A * | 4/1995 | Iguchi et al. | 358/406 |
| 5,552,901 A | 9/1996 | Kikuchi et al. | |
| 5,587,809 A | 12/1996 | Le Corre et al. | |
| 5,623,655 A | 4/1997 | Chisaka | |
| 5,625,465 A | 4/1997 | Lech et al. | |
| 5,631,984 A | 5/1997 | Graf et al. | |
| 5,768,416 A | 6/1998 | Lech et al. | |
| 5,966,663 A | 10/1999 | Gleason | |
| 5,995,242 A * | 11/1999 | Izumisawa et al. | 358/434 |
| 6,031,975 A * | 2/2000 | Iijima | 358/1.15 |
| 6,094,505 A | 7/2000 | Lech et al. | |
| 6,397,261 B1 | 5/2002 | Eldridge et al. | |
| 6,510,992 B2 | 1/2003 | Wells et al. | |
| 6,529,956 B1 | 3/2003 | Smith et al. | |
| 6,584,564 B2 * | 6/2003 | Olkin | H04L 12/5875 713/151 |
| 6,610,955 B2 | 8/2003 | Lopez | |
| 6,683,697 B1 | 1/2004 | Lech et al. | |
| 6,697,703 B2 | 2/2004 | Lopez | |
| 6,819,777 B2 | 11/2004 | Baker et al. | |
| 6,909,805 B2 | 6/2005 | Ma et al. | |
| 6,940,617 B2 | 9/2005 | Ma et al. | |
| 6,963,971 B1 | 11/2005 | Bush et al. | |
| 7,058,685 B1 | 6/2006 | van Zee et al. | |
| 7,072,514 B1 | 7/2006 | Thouin | |
| 7,075,673 B2 | 7/2006 | Lech et al. | |
| 7,162,635 B2 | 1/2007 | Bisbee et al. | |
| 7,184,162 B2 | 2/2007 | Lech et al. | |
| 7,259,887 B2 | 8/2007 | Lech et al. | |
| 7,283,270 B2 | 10/2007 | Boire-Lavigne et al. | |
| 7,474,434 B2 | 1/2009 | Lech et al. | |
| 7,570,383 B2 | 8/2009 | Lech et al. | |
| 7,619,768 B2 | 11/2009 | Lech et al. | |
| 7,672,007 B2 | 3/2010 | Lech et al. | |
| 7,957,018 B2 | 6/2011 | Rudolph et al. | |
| 8,081,332 B2 | 12/2011 | Nagarajan et al. | |
| 8,176,334 B2 | 5/2012 | Vainstein | |
| 8,218,179 B2 | 7/2012 | Nakajima | |
| 2002/0023222 A1 | 2/2002 | Gefwert | |
| 2002/0194278 A1 | 12/2002 | Golan | |
| 2003/0145212 A1 | 7/2003 | Crumly | |
| 2004/0158733 A1 | 8/2004 | Bouchard | |
| 2004/0221014 A1 | 11/2004 | Tomkow | |
| 2004/0240735 A1 | 12/2004 | Medina | |
| 2005/0192924 A1 | 9/2005 | Drucker et al. | |
| 2006/0238822 A1 | 10/2006 | Van Hoof | |
| 2007/0174402 A1 | 7/2007 | Tomkow | |
| 2008/0002224 A1 | 1/2008 | Tanimoto | |
| 2008/0019519 A1 | 1/2008 | Su et al. | |
| 2008/0097998 A1 | 4/2008 | Herbach | |
| 2008/0097999 A1 | 4/2008 | Horan | |
| 2008/0104408 A1 | 5/2008 | Mayer | |
| 2008/0133940 A1 | 6/2008 | Laurie et al. | |
| 2008/0144121 A1 | 6/2008 | Malatesta | |
| 2008/0256061 A1 | 10/2008 | Chang et al. | |
| 2010/0058485 A1 | 3/2010 | Gonzalez | |
| 2010/0067067 A1 | 3/2010 | Lech et al. | |
| 2010/0223467 A1 | 9/2010 | Dismore et al. | |
| 2010/0281254 A1 | 11/2010 | Carro et al. | |
| 2010/0304766 A1 | 12/2010 | Goyal | |

OTHER PUBLICATIONS

Beretta et al., "Perceptually lossy compression of documents", HPL-97-23, Jan. 1997, 13 pgs.

Evans, Christopher, "Notes on the OpenSURF Library," Jan. 18, 2009, 25 pages.

Kesavamurthy et al., "Pattern Classification using imaging techniques for Infarct and Hemorrhage Identification in the Human Brain," Calicut Medical Journal 2006; 4(3):e1, 5 pages.

Klein, "A2iA, Recognizing the Worlds's Handwriting", Mar. 26, 2009, pp. 1-13.

Nielson, Heath and Barrett, William, "Automatic Zoning of Digitized Documents," available at: http://fht.byu.edu/prev_workshops/workshop01/final/Nielson.pdf, last visited Aug. 25, 2010, 2 pages.

Ye, Xiangyun et al., "A Generic System to Extract and Clean Handwritten Data from Business Forms," Proceedings of the Seventh International Workshop on Frontiers in Handwriting Recognition, Sep. 11-13, 2000, pp. 63-72.

"Hausdorff Distance Image Comparison," available at http://www.cs.cornell.edu/Vision/hausdorff/hausdist.html, copyright 2000, 2 pages [retrieved on Jul. 2, 2009].

"Optical Mark Recognition," Wikipedia, the free encyclopedia, available at: http://en.wikipedia.org/wiki/Optical_mark_recognition, last modified on Oct. 16, 2009, pp. 1-6 [retrieved on Oct. 21, 2009].

* cited by examiner

MANAGED VIRTUAL POINT TO POINT COMMUNICATION SERVICE HAVING VERIFIED DIRECTORY, SECURE TRANSMISSION AND CONTROLLED DELIVERY

This application is a continuation under 37 C.F.R. §1.53(b) of U.S. patent application Ser. No. 12/632,477, filed Dec. 7, 2009, which is hereby incorporated by reference in its entirety.

TECHNICAL FIELD

The present description relates generally to a system and method, generally referred to as a system, for providing a managed virtual point to point communication service utilizing a verified directory, secure transmission, and controlled delivery, and more particularly, but not exclusively, to providing a system for securely transmitting electronic document images between verified users where delivery of the electronic document images can be controlled and verified.

BACKGROUND

Existing systems for transmitting electronic document images may lack the security and reliability desired by industries which utilize electronic document transmission, such as the banking industry, the health care industry, and the legal industry amongst others. For example, facsimile (fax) systems may not provide adequate security to be acceptable for sending private documents, confidential documents, or generally any documents for which privacy, confidentiality or security may be a concern. A sender of a fax may be unable to verify that the fax was delivered to the intended recipient without having been intercepted and/or viewed by intervening users. Furthermore, a sender of a fax may be unable to verify that the fax was actually received by the intended recipient. The sender may receive a confirmation that the fax was transmitted to a particular telephone number; however, due to the common practice of sharing fax machines in corporate environments or technical issues, e.g. that the machine is operating correctly or has sufficient paper, toner or ink, the sender may be unable to verify that the intended recipient received the fax.

Email or other electronic messaging systems may also be inadequate for transmitting documents for which privacy, confidentiality or security is a concern. For example, a fraudulent individual may obtain an email account and/or messaging service account using fraudulent information. The individual could use the email and/or messaging account to fraudulently send and/or receive electronic document images. Thus, email and messaging services may be undesirable for any electronic document image transmission requiring verification of the identity of the sending and/or receiving user as the users of these systems may not be assured of each other's identity. While some email systems may allow users to request a read receipt or a delivery receipt for an email, the read receipts and delivery receipts fail to confirm that the user who received the message was the intended recipient.

Furthermore, fax, email and other electronic messaging systems may provide little to no control to the sender of an electronic document image once the electronic document image is sent. Some email systems may allow a sender to recall a message, but this functionality is often limited and unreliable. Generally, messages sent in these systems are not controllable by the sending user, and the sending user may have no way of verifying whether the message was successfully delivered to the intended recipient.

SUMMARY

A system for providing a managed virtual point to point communication service utilizing a verified directory, secure transmission, and controlled delivery may include a memory, an interface, and a processor. The memory may be operative to store a verified directory of users. Each entry in the verified directory may include an identifier representative of the identity of a user. The identity of each of the users in the verified directory may have been verified as identifying the user represented thereby. The interface may be coupled to the memory and may be operative to communicate with a sending device of a sending user in the verified directory and a receiving device of a receiving user in the verified directory. The processor may be coupled to the memory and the interface, and may be operative to receive, via the interface, a request to deliver an electronic document image from the sending user to the receiving user. The processor may provide, via the interface, secure access to the electronic document image to the receiving user via the receiving device. The processor may provide, via the interface, a delivery confirmation to the sending device of the sending user upon determining that the electronic document image was securely accessed by the receiving user. The delivery confirmation may indicate that the electronic document image was securely transmitted to the receiving user via the receiving device.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
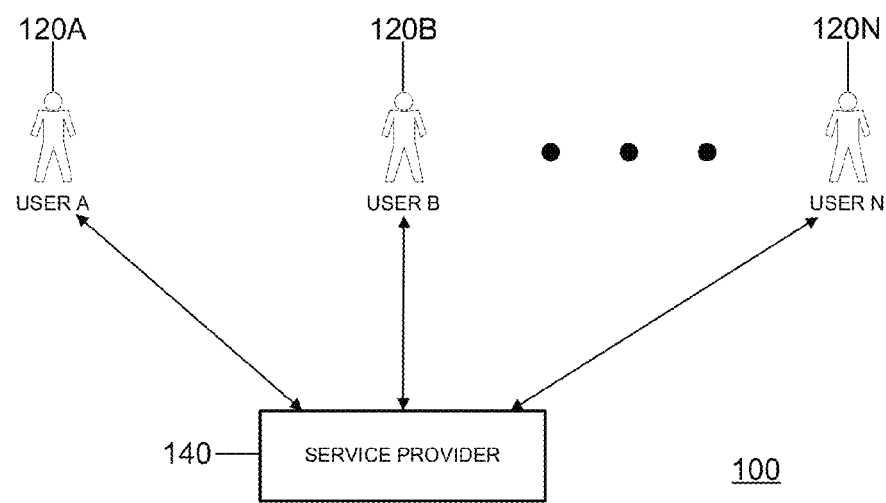
FIG. 1 is a block diagram of a general overview of a system for providing a managed virtual point to point communication service utilizing a verified directory, secure transmission, and controlled delivery.

The disclosed embodiments relate to a system for providing a managed virtual point to point communication service utilizing a verified directory, secure transmission, and controlled delivery, and more particularly, but not exclusively, to providing a system for securely transmitting electronic document images between verified users where delivery of the electronic document images can be controlled and verified. The principles described herein may be embodied in many different forms.

A managed virtual point to point communication service provider may maintain a directory, or registry, of verified users. The directory may include an identifier for each user which may be used to securely transmit electronic document images and/or messages to the user. The service provider may verify the identity of each user before the user is added to the directory. For example, the service provider may perform a background check, a credit check, or generally any check for verifying the identity of a user. Once a user's identity has been verified, the user may be added to the directory and may be provided access to the directory of verified users such that the user may securely transmit electronic document images to the verified users listed in the directory.

The directory may be hosted by the service provider, such that verified users access the directory through the service provider, such as with a thin client, in order to identify other verified users for engaging in secure electronic document image transmission. Alternatively, or in addition, the service provider may provide each of the verified users with a unique user identifier, similar to a telephone number or an email address. A verified user can initiate a secure transmission of an electronic document image to another user using the unique user identifier, without having to access the directory through the service provider. The verified users may provide the unique user identifiers to one another independent of the service provider, such as through business cards, letterhead, email signatures, or other mechanisms for disseminating a unique user identifier.

The directory may include data identifying the mechanism for securely transmitting electronic document images to the verified users, such as an Internet Protocol (IP) address of the user, a telephone number of the user, one or more authorized machine identifiers of the user, or a physical mailing address of the user. For example, a verified user may authorize one or more devices to receive electronic document images from the service provider. The service provider may store an IP address, Media Access Control address (MAC address), or other machine identifier of each authorized device. The directory may also store an indication of whether electronic document images can be automatically securely transmitted to one or more of the authorized devices, irrespective of the availability of the user, and/or whether the electronic documents can be sent to a verified user through an unauthorized device, such as through an unauthorized public device a verified user may log onto, such as in library a copy center, or generally any publically available device. The directory may also include data identifying the mechanism for securing the electronic document image, or the transmission thereof, such as encryption parameters, a public key of a user, or generally any data which may identify a mechanism for securing an electronic document image, or the transmission thereof.

A sending user may initiate a secure transmission of an electronic document image to a receiving user listed in the verified directory through the use of any device capable of generating, or retrieving, an electronic image of one or more documents and communicating a delivery request including the electronic document image to the service provider. Upon receiving the delivery request, the service provider may securely transmit the electronic document image to the receiving user such that only the receiving user is able to view the electronic document image. The service provider may control the delivery of electronic document image such that the electronic document image is securely transmitted to the receiving user at a time when the receiving user is available to receive the electronic document image. For example, the service provider may monitor an online presence of the receiving user to determine when the receiving user is available to receive the electronic document image. Alternatively, the service provider may notify the receiving user that the electronic document image is available for secure transmission, and may securely transmit the electronic document image upon receiving a response from the receiving user.

The secure transmission of an electronic document image may be accomplished by one or more security protocols. For example, the service provider may generate a public key and a private key for each of the verified users. The service provider may provide each user with their respective private key and may associate each user's public key with the user's entry in the verified directory. In this example, a user sending an electronic document image may retrieve the public key of the receiving user from the verified directory and may encrypt the electronic document image using the public key of the receiving user. The receiving user may then decrypt the electronic document image using the private key provided by the service provider. Alternatively, the service provider may connect a sending user to a receiving user through a secure communication channel. For example, the service provider may authenticate each user and then may create a secure connection for the users to communicate through, such as through a secure sockets layer (SSL) connection. The users may communicate electronic document images or other messages through the secure connection.

The service provider may allow a sending user to control aspects of the delivery of the electronic document image. For example, in the delivery request the user may specify one or more variables related to the delivery of the electronic document image, such as a delivery start date/time, a delivery expiration date/time, a delivery criterion, or generally any variable related to the secure transmission and delivery of the electronic document image. The expiration date/time may identify the latest date/time the electronic document image should be delivered to the receiving user. In other words, if the service provider is unable to deliver the electronic document image to the receiving user before the expiration date/time, then the service provider should not deliver the electronic document image to the receiving user. Alternatively, delivery criteria may be related to the type of electronic document image being securely transmitted. For example, in the case of a commodity purchase agreement, the sending user may specify that the electronic document image should only be sent to the receiving user if a price of the commodity exceeds a threshold price. The criteria may also stipulate that if the electronic document image cannot be delivered before the price of the commodity exceeds a second threshold price, then the electronic document image should not be delivered at all. Generally, the criteria may include any conditions describing any values determinable by the service provider.

The service provider may allow a sending user to control aspects of the secure transmission of an electronic document image in the process of being delivered at any time prior to the actual delivery of the electronic document image. For example, the sending user may withdraw the electronic document image, modify the receiving user or users of the electronic document image, replace the electronic document image, append to the electronic document image, modify one or more delivery variables associated with the delivery of the electronic document image, or generally modify any aspect of the secure transmission prior to delivery.

The service provider may also provide one or more notifications, or confirmations, to a sending user in order to keep the sending user apprised of the progress of the secure transmission of the electronic document image. The sending user may configure whether to receive notifications from the service provider, which notifications to receive from the service provider and/or the level of detail of notifications received from the service provider. For example, upon receiving the delivery request, the service provider may respond to the sending user with a request received confirmation indicating that the delivery request has been received. The request received confirmation may include the electronic document image such that the sending user may verify that the correct electronic document image is being securely transmitted to the receiving user. The service provider may also provide a delivery notification to the sending user upon receiving a confirmation from the receiving user that the electronic document image was received. The delivery notification may include additional information related to the secure transmission of the electronic document image, such as the date/time the receiving user received the electronic document image, the date/time the receiving user viewed the electronic document image, and any other feedback provided by the receiving user, such as information pertaining to the quality of the electronic document image, information pertaining to any errors in the electronic document image, or answers to any questions posed in the electronic document image. The service provider may also provide failure or error notifications to the sending user and/or receiving user, such as providing a delivery failed notification upon determining that the delivery failed or one of the delivery criteria was not satisfied.

In another embodiment, the delivery request received from the sending user may include one or more additional data items related to the electronic document image. For example, if the electronic document image comprises a form which includes handwritten data, the sending user may include data items describing the handwritten data with the delivery request to be delivered to the receiving user. Since handwritten data may not always be legible, the sending user can clarify the handwritten data by inputting alphanumeric characters representative of the handwritten data into the sending device.

In another embodiment, the service provider may require that a sending user be authorized by a receiving user in order to send electronic document images to the receiving user. The service provider may not fulfill a delivery request from a sending user if the sending user is not authorized to send electronic document images to the receiving user. If the sending user is not authorized, the sending user may transmit a request to be authorized by the receiving user to the service provider, and the service provider may communicate the request to the receiving user. If the receiving user approves the authorization request, delivery requests from the sending user to deliver electronic document images to the receiving user may be fulfilled by the service provider.

In another embodiment, the service provider may store copies of each electronic document image securely transmitted. The stored electronic document images may serve as an archive, or repository, for the verified users. The users may only have access to electronic document images of which they were a sender and/or a receiver. Alternatively, a sender and/or receiver of an electronic document image may authorize other users to access the electronic document image they sent or received. The service provider may operate a web-based electronic document image/file repository where authorized users may access the electronic document images from any web-accessible device. The service provider may charge the users a fee to access the archived documents, such as a periodically reoccurring fee or a per document fee.

In another embodiment, the service provider may transform the electronic document image and may securely transmit the transformed electronic document image to the receiving user. For example, the service provider may print the electronic document image onto physical paper and may securely transmit the physical document to the receiving user, such as through certified mail, courier delivery, or any other mechanism for securely transmitting a physical document. Alternatively, the service provider may perform optical character recognition (OCR) on the electronic document image to transform the electronic document image into machine-editable text. The machine-editable text may be securely transmitted to the receiving user through plaintext email or through a text message, such as a Short Message Service (SMS) message. Alternatively, the electronic document image may be transformed to an audio waveform. The audio waveform may be securely transmitted to the receiving user by through an audio receiving device, such as a telephone, a handheld transceiver, or generally any device capable of receiving audio. Generally, the service provider may transform the electronic document image into any format capable of being securely transmitted to, and accessed by, the receiving user.

FIG. 1 provides a general overview of a system providing a managed virtual point to point communication service utilizing a verified directory, secure transmission, and controlled delivery. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N and a service provider 140. The service provider 140 may provide a managed virtual point to point communication service utilizing a verified directory, secure transmission of electronic document images, and controlled delivery of electronic document images to the users 120A-N. The users 120A-N may be any individuals who wish to send and/or receive secure electronic document images or other messages through the managed virtual point to point delivery communication service provided by the service provider 140. For example, the users 120A-N may be individuals working in an industry which utilizes paper documents of which privacy and verifiable delivery is a concern, such as the financial services industry, the health care industry, the legal industry, or generally any industry of which the secure and verifiable transmission of private documents is desirable.

The users 120A-N may register with the service provider 140 in order to access the verified directory and utilize the secure transmission and controlled delivery of electronic document images. The service provider 140 may verify the identity of each of the users 120A-N prior to granting the users 120A-N access to the service. The steps of a user verification and registration operation are discussed in more detail in FIG. 3 below. The extent of the verification of the users 120A-N may depend on a level of integrity associated with the types of electronic document images the user wishes to send and/or receive, and/or the types of transactions the user wishes to engage in through the system 100. For example, if a user A 120A wishes to send and/or receive electronic document images associated with financial transactions, the service provider 130 may perform an extensive verification of the identity of the user A 120A, such as a background check. Alternatively, if the user A 120A wishes to send and/or receive electronic document images which contain public information, or information which otherwise does not require a high level of security, the verification of the identity of the user A 120A may be less extensive, such as a credit card verification.

Once the identity of a user A 120A has been verified, the service provider 140 may add the user A 120A to the directory of verified, or registered, users 120A-N. The service provider 140 may generate a user identifier for the user A 120A which may be used by the other users 120B-N to send electronic document images to the user A 120A. If the service provider 140 utilizes a public-private key exchange for encrypting and decrypting secure transmissions of electronic document images, the service provider 140 may generate a private key and a public key for the user A 120A. The public key and the user identifier may be stored in the directory, and the private key may be provided to the user A 120A. The public key of the user A 120A may be used by the other users 120B-N to encrypt electronic document images sent to the user A 120A, and the user A 120A may use the private key to decrypt electronic document images received from the users 120B-N which were encrypted using the public key of the user A 120A.

The service provider 140 may maintain the directory listing the verified users 120A-N. The service provider 140 may periodically re-verify the identity of each of the users 120A-N to ensure the integrity of the directory is not compromised over time. Since the identity of each of the users 120A-N listed in the directory is verified by the service provider 140, users 120A-N sending an electronic document image can be assured of the identity of the receiving user. Conversely, users 120A-N receiving an electronic document image from other users 120A-N listed in the directory can be assured of the identity of the sending user.

For example, if the service utilizes public and private keys, the user A 120A may retrieve the user identifier and the public key of the user B 120B from the verified directory. The user A 120A may use the public key of the user B 120B to encrypt an electronic document image being sent to the user B 120B. The user A 120A may transmit a delivery request including the identifier of the user B 120B and the encrypted electronic document image to the service provider 140. The service provider 140 may send a request received confirmation to the user A 120A, upon receiving the delivery request from the user A 120A. The service provider 140 may securely transmit the electronic document image to the user B 120B when the user B 120B is available to receive the electronic document image. For example, the service provider 140 may determine an online presence of the user B 120B, and, if the online presence indicates that the user B 120B is available, the service provider 140 may transmit the electronic document image to the user B 120B. If the electronic document image is encrypted, the user B 120B may decrypt the electronic document image using their private key. Upon viewing, or receiving, the electronic document image, the user B 120B may send a confirmation to the service provider 140 indicating that the electronic document image was received. Upon receiving the confirmation from the user B 120B, the service provider 140 may send a delivery confirmation to the user A 120A. The steps of securely transmitting electronic document images with controlled and verifiable delivery are discussed in more detail in FIGS. 4-6 below.

If the user B 120B is unavailable to receive the electronic document image, the service provider 140 may send a notification to the user B 120B indicating that the electronic document image is available to be retrieved by the user B 120B. The user B 120B may respond to the notification from the service provider 140 when they become available to receive the electronic document image. Upon receiving the response from the user B 120B, the service provider 140 may securely transmit the electronic document image to the user B 120B.

In another embodiment, the user A 120A may authorize whether each of the other users 120B-N may send electronic document images to the user A 120A. For example, the user B 120B may request to send electronic document images to the user A 120A. The user A 120A may authorize the user B 120B to send electronic document images to the user A 120A. The service provider 140 may maintain which of the users 120A-N may send electronic document images to the other users 120A-N through the service. The users 120A-N may only have access to the user identifiers and public keys, if necessary, of the users 120A-N who they have been authorized to send electronic document images to. Thus, in this instance, the directory provided to each of the users 120A-N may vary depending upon which of the other users 120A-N the users 120A-N have been authorized to send electronic document images to.

Furthermore, the user A 120A may authorize which of the users 120B-N may receive electronic document images from the user A 120A. In this instance, the service provider 140 may ensure that the user A 120A does not unintentionally send an electronic document image to an unintended recipient. Generally, the service provider 140 may provide any level of access control to the verified directory. For example, an organization may have a verified account with the service provider 140, and the organization's account may have several verified sub-accounts for each of the users 120A-N of the organization. The organization may implement user-level access control to identify who each of the users 120A-N can send electronic document images to, and who each of the users 120A-N can receive electronic document images from.

The service provider 140 may utilize the verified directory to provide a secure service which allows the users 120A-N to communicate in real-time. For example, the users 120A-N may engage in a secure instant-messaging type chat with one another. Since the users 120A-N may only interact with other users 120A-N listed in the directory, whose identities have been verified by the service provider 140, the users 120A-N can be assured of the identity of the person they are communicating with. Thus, the users 120A-N may use the service to perform stock or commodity trading through an instant messaging conversation with a stock broker or commodities broker, without the concern of fraudulent activity.

Alternatively or in addition, the service provider 140 may provide certificates to the users 120A-N, such as secure socket layer (SSL) certificates. The certificates may verify the identity of the users 120A-N such that the users 120A-N may communicate directly with one another without having to communicate through the service provider 140. In this instance, the service provider 140 may verify the validity of the certificates of the users 120A-N before and/or during interactions between the users 120A-N.

Figure 2:
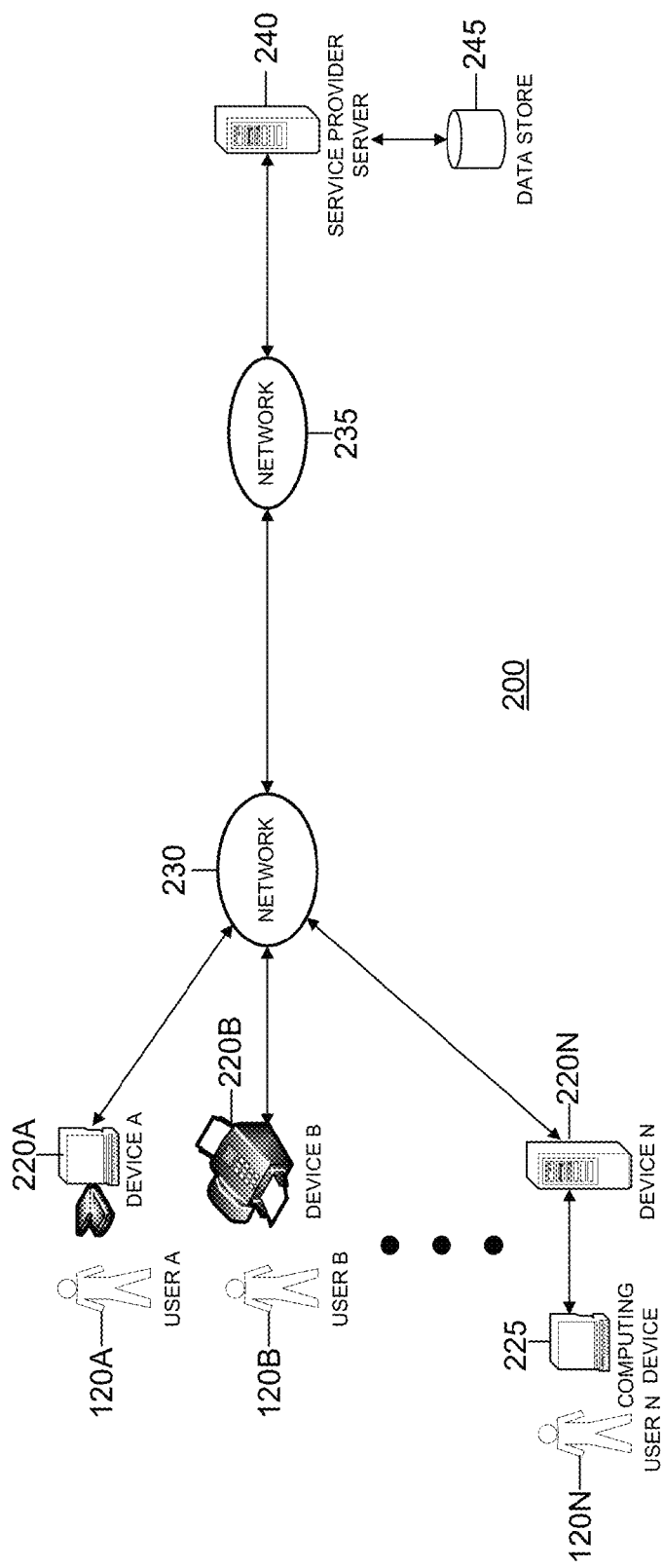
FIG. 2 is block diagram of a network environment implementing the system of FIG. 1 or other systems for providing a managed virtual point to point communication service utilizing a verified directory, secure transmission, and controlled delivery.

FIG. 2 provides a simplified view of a network environment 200 implementing the system of FIG. 1 or other system for providing a managed virtual point to point communication service utilizing a verified directory, secure transmission, and controlled delivery. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more devices 220A-N of the users 120A-N, a computing device 225, networks 230, 235, a service provider server 240 and a data store 245. The devices 220A-N, the computing device 225, and the service provider server 240 may be one or more computing devices of various kinds, such as the computing device described in FIG. 7 below. Such computing devices may generally include any device that may be configured to perform computation, and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. The devices 220A-N, and the service provider server 240, may be connected to the networks 230, 235 in any configuration that supports the transmission of data. This may include a data connection to the networks 230,235 that may be wired or wireless.

The device 220A may include a computing device and a scanning device. The computing device and the scanning device may be integrated into one unit or may be separate devices. The computing device and scanning device may communicate with each other through a wired interface, such as universal serial bus (USB), or through a wireless interface, such as Bluetooth. The scanning device may optically scan a document and convert the document into a digital image. The computing device may be any device capable of manipulating data according to a set of instructions, such as the computing device described in FIG. 7 below. The computing device may include a processor, a memory, and an interface. The computing device may encrypt outbound electronic document images by retrieving the public key of the intended recipient from the service provider server 240, and may decrypt inbound electronic document images using the private key of the user A 120A.

The device 220B may be a computing device, such as the computing device described in FIG. 7 below, in the form factor of a traditional fax machine. For example, the device 220B may be a traditional fax machine which is retrofitted, such as with an adapter, which provides the functionality required to operate in the system 100. The device 220B may include an input device, such as a keyboard and/or a touch screen. The device 220N may be a local server which provides remote access to the user N 120N, and any other authorized users. The user N 120N may use a computing device 225, such as the computing device described in FIG. 7 below, to communicate with the device 220N over a network, such as the network 230. The user N 120N, and any other authorized users, may login to the device 220N to view and/or print electronic document images.

Alternatively or in addition, the devices 220A-N may include any device, or group of communicating devices, capable of converting a document into a digital image and communicating the digital image to the service provider server 240. For example, one of the devices 220A-N may be a mobile phone with a camera, such as an Apple iPhone™, which can create a digital image of a document, using the camera, and then can communicate the digital image to the service provider server 240, such as over a cellular network. Alternatively, the devices 220A-N may be any other devices including, or capable of interfacing with, a digital image acquisition device, such as a personal digital assistant (PDA), network-enabled television, digital video recorder, such as TIVO®, video game console/device, automobile and/or any other appliance or device capable of acquiring and communicating a digital image of a document. The devices 220A-N of the receiving users may only require a mechanism to view an electronic document image, or a transformation or rendering thereof, and therefore may not require a mechanism for converting a document into a digital image. For example, a receiving user may view an electronic document image through an e-book device, such as an Amazon Kindle™, which may or may not include a scanning mechanism.

Alternatively or in addition, the devices 220A-N may run one or more operating systems, such as Microsoft Windows XP™, Apple Max OS X™, Microsoft Windows Vista™, Microsoft Windows 7™, Berekeley Software Distribution™ (BSD), or generally any Microsoft Windows™ variants, any Apple Mac OS™ variants, any UNIX or Linux variants, or any operating system which supports applications for generating and communicating a digital image of a document.

The service provider server 240 may also provide a user interface to the users 120A-N which allows the users 120A-N to modify their user information stored in the verified directory. For example, the service provider server 240 may provide the users 120A-N with a thin client user interface, such a web interface, which allows the users 120A-N to authenticate and modify their user information stored in the verified directory.

The users 120A-N may authenticate with the service provider server 240 using one or more credentials, such as a login and password, a biometric credential, a smart card, or generally any credential which may verify the identity of the users 120A-N. Alternatively or in addition, the authentication may be a multiple-factor authentication, such as two-factor authentication, where multiple different factors are used in conjunction to authenticate the users 120A-N. The different factors may be an identifier a user knows, such as a password or pin, an identifier a user is in possession of, such as a smartcard or a token, or a biometric identifier of a user, such as a fingerprint or iris scan. For example, the service provider 130 may provide the users 120A-N with a token, such as an RSA SecurID™ token or an electronic token running in a mobile device, such as an Apple iPhone™, which produces a number or pin. The users 120A-N may input the number or pin along with at least one other credential to authenticate with the service provider server 240.

The service provider server 240 may include one or more of the following: an application server, a data store, such as the data store 245, a database server, and/or a middleware server. The application server may be APACHE TOMCAT®, MICROSOFT IIS®, ADOBE COLDFUSION®, or any other application server that supports communication protocols. The middleware server may be any middleware that connects software components or applications. The service provider server 240 may exist on one machine or may be running in a distributed configuration on one or more machines.

The service provider server 240 may communicate with the devices 220A-N using ports 80 and 443. Port 80 may generally be associated with Hypertext Transfer Protocol (HTTP) transactions, and therefore may be open on most firewalls. Port 443 may be associated with Hypertext Transfer Protocol Secure (HTTPS) transactions, and therefore may also be open on most firewalls. Thus, there may not be any specific network configurations required for the service provider server 240 to communicate with the devices 220A-N, even if the devices 220A-N are behind firewalls, such as corporate firewalls.

The data store 245 may be operative to store data, such as the directory of users 120A-N or data relating to the directory of users 120A-N, maintained by the service provider 140. For example, the data store 245 may store the user identifier and public key of each of the users 120A-N and any send/receive access permissions set by the users 120A-N. The data store 245 may store identifying information of the users 120A-N, such as logins, passwords, billing addresses or other any other identifying information of the users 120A-N. The data store 245 may also store archived copies of each electronic document image and/or file sent through the verified secure electronic document image delivery service. The data store 245 may store information describing mechanisms for securely transmitting electronic document images to each of the users 120A-N, such as mailing addresses, telephone numbers, authorized machine identifiers, such as IP addresses and/or MAC addresses, email addresses, or generally any mechanism for securely transmitting electronic document images, or transformations or renderings thereof, to each of the users 120A-N. The data store 245 may also store information describing mechanisms for securing the electronic document images for each of the users 120A-N, or the transmission thereof, such as encryption parameters, public keys, passwords, or generally any mechanism for securing the electronic document images, or the transmission thereof.

The verified directory may be hosted by the service provider server 240 and stored in the data store 245. The service provider server 240 may provide access to the users 120A-N to the verified directory, such as through a thin client interface on the devices 220A-N. In this instance, only the information pertaining to a selected receiving user may be transferred to, and stored on, the devices 220A-N. Alternatively, or in addition, the service provider server 240 may provide the verified directory to the devices 220A-N of the users 120A-N. In this instance, the service provider server 240 may have a mechanism in place for ensuring that the verified directories stored on the devices 220A-N are synchronized with the verified directory stored in the data store 245. For example, each time a user A 120A communicates with the service provider server 240, the service provider server 240 may synchronize the verified directory stored locally on the device 220A of the user A 120A with the verified directory stored on the data The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240. There may be several configurations of database servers which provide access to the data store 245. Database servers may include MICROSOFT SQL SERVER®, ORACLE®, IBM DB2® or any other database software, relational or otherwise The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
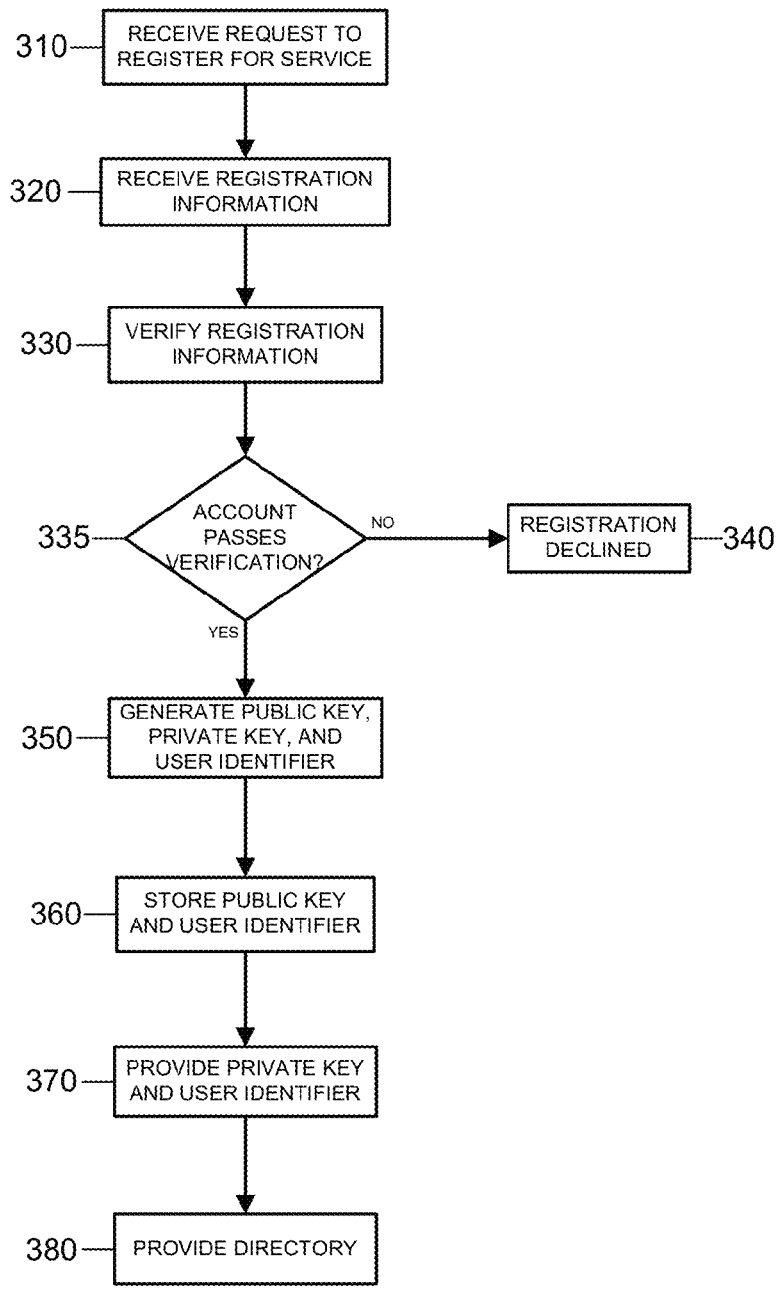
FIG. 3 is a flowchart illustrating a user verification operation in the systems of FIG. 1 and FIG. 2, or other systems for providing a managed virtual point to point communication service utilizing a verified directory, secure transmission, and controlled delivery.

FIG. 3 is a flowchart illustrating a user verification operation in the systems of FIG. 1 and FIG. 2, or other systems for providing a managed virtual point to point communication service utilizing a verified directory, secure transmission, and controlled delivery. The steps of FIG. 3 are described as being performed by the service provider server 240. However, the steps may be performed by the processor of the service provider server 240, or by any other hardware component of the service provider server 240. Alternatively the steps may be performed by an external hardware component, such as a hardware component in communication with the service provider server 240.

At step 310, the service provider server 240 receives a request from one of the users 120A-N, such as the user A 120A, to register for the managed virtual point to point communication service. For example, the user A 120A may utilize a user interface on the device 220A to communicate the request to the service provider server 240. The user interface may be provided by the service provider server 240, such as through a web application, a standalone application, or a mobile application. At step 320, the service provider server 240 may receive registration information, such as user information, from the user A 120A. The service provider server 240 may use the registration information to verify the identity of the user A 120A. For example, the user A 120A may provide an address, a credit card number, or generally any information which may be used to verify the identity of the user A 120A. Alternatively, the service provider 140 may require the user A 120A to sign a service contract, or other physical document, which verifies the identity of the user A 120A.

At step 330, the service provider server 240 may verify the identity of the user A 120A using the registration information provided by the user A 120A in step 320. The user verification may be automatic, such as by verifying a billing address of the user A 120A through a credit reporting agency, or initiating a communication with the user A 120A using a phone number provided by the user A 120A. Alternatively, the user verification process may be an offline process that occurs over an extended period of time, such as a day or a week. The offline process may include an extended credit check, or generally any procedure for verifying the identity of the user A 120A. Alternatively or in addition, the offline process may include one or more checks for verifying the integrity of the user A 120A. For example, the service provider 140 may investigate the background of the user A 120A, or the corporation represented by the user A 120A, to verify the integrity of the user A 120A and/or the corporation.

At step 335, the service provider server 240 determines whether the user A 120A passes the verification process. If, at step 335, the service provider server 240 determines that the user A 120A does not pass the verification process, the service provider server 240 moves to step 340. At step 340, the service provider server 240 notifies the user A 120A that their registration request was declined. The service provider server 240 may provide information describing why the registration request was declined, such as inaccurate user information, user integrity check failed, or generally any information describing why the registration request of the user A 120A was declined. Alternatively, the service provider server 240 may provide no information as to why the registration request of the user A 120A was declined.

If, at step 335, the service provider server 240 determines that the user A 120A passes account verification, the service provider server 240 moves to step 350. At step 350, the service provider server 240 generates a user identifier for the user A 120A. The user identifier may be an identifier used by the other users 120B-N to securely transmit electronic document images to the user A 120A. For example, the user identifier may be a ten-digit number, such as a telephone number, or generally the user identifier may be any string of alphanumeric characters. The user A 120A may use the user identifier, and a password, to authenticate with the service provider server 240. Alternatively or in addition, the service provider server 240 may allow the user A 120A to establish alternative login credentials, such as a smart card, a radio frequency identification card, biometric credentials, such as a fingerprint, or generally any login credentials capable of verifying the identity of the user A 120A. If the verified directory provided by the service provider server 240 utilizes public and private keys, the service provider server 240 may generate a public key and private key for the user A 120A. The public key and the private key may be asymmetric keys used to encrypt and decrypt electronic document images, i.e. the public key may be used to encrypt electronic document images and the private key may be used to decrypt electronic document images. The public key and the private key may be generated using any asymmetric key technique, such as the Diffie-Hellman key exchange protocol.

At step 360, the service provider server 240 stores the public key of the user A 120A and the user identifier of the user A 120A, such as in the data store 245. The service provider server 240 may also store any additional login credentials of the user A 120A in the data store 245. Alternatively or in addition, the service provider server 240 may store information for automatically routing electronic document images to the user A 120A, such as an internet protocol (IP) address of the device 220A. At step 370, the service provider server 240 provides the private key, the user identifier, and any additional login credentials to the user A 120A. At step 380, the service provider server 240 provides the verified directory of the users 120A-N to the user A 120A. The directory may include the public key and user identifier of each of the users 120A-N. Alternatively or in addition, the directory provided to the user A 120A may only include the users 120B-N who have authorized the user A 120A to send electronic document images to them. Alternatively or in addition, instead of providing the directory to the user A 120A, the service provider server 240 may provide the user A 120A with access to the directory. In this example, the verified directory may be stored on the service provider server 240, or in the data store 245, and the user A 120A may utilize a user interface, such as an address book, to remotely access the verified directory.

Figure 4:
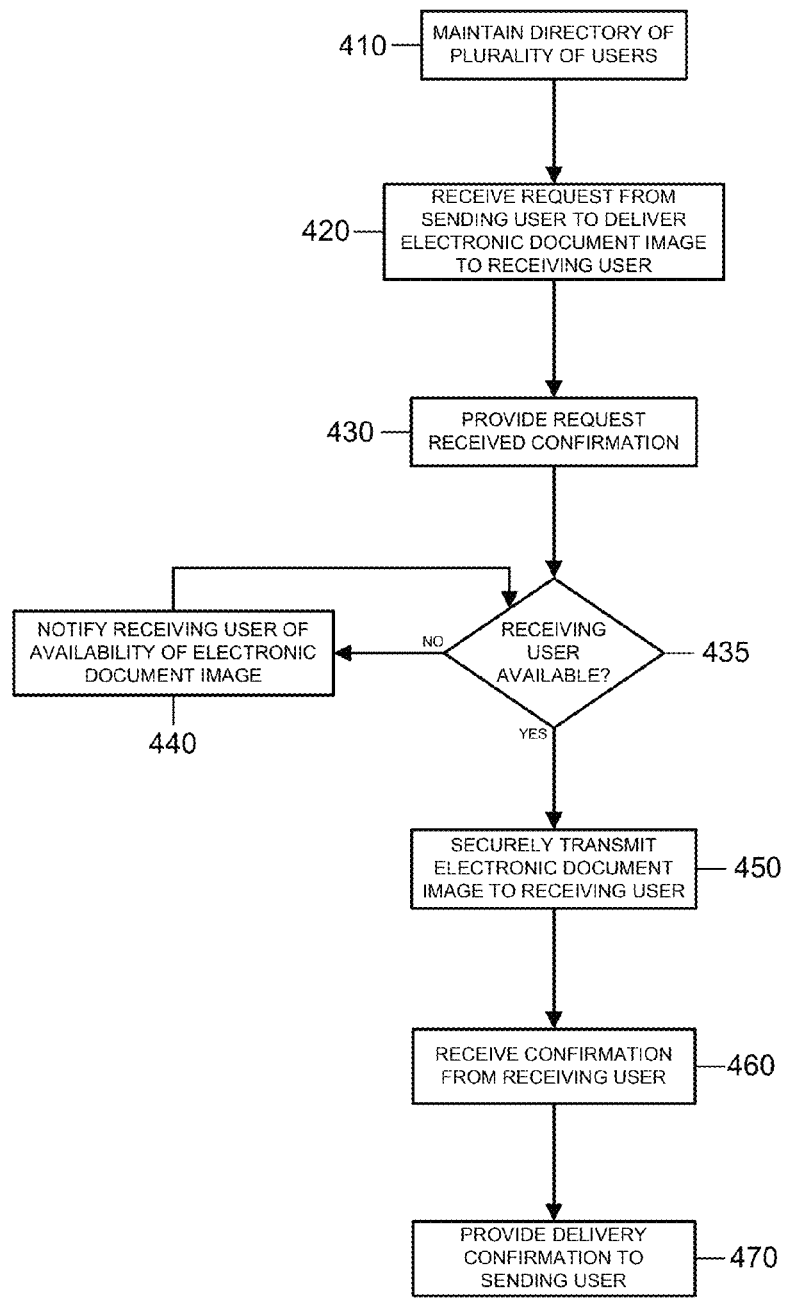
FIG. 4 is a flowchart illustrating a verified secure electronic document image delivery operation in the systems of FIG. 1 and FIG. 2, or other systems for providing a managed virtual point to point communication service utilizing a verified directory, secure transmission, and controlled delivery.

FIG. 4 is a flowchart illustrating a verified secure electronic document image delivery operation in the systems of FIG. 1 and FIG. 2, or other systems for providing a managed virtual point to point communication service utilizing a verified directory, secure transmission, and controlled delivery. The steps of FIG. 4 are described as being performed by the service provider server 240. However, the steps may be performed by the processor of the service provider server 240, or by any other hardware component of the service provider server 240. Alternatively the steps may be performed by an external hardware component, such as a hardware component in communication with the service provider server 240.

At step 410, the service provider server 240 may maintain a verified directory of a plurality of users 120A-N. The verified directory may include a user identifier of each of the other users 120A-N. The verified directory may also include implementation specific information related to the users 120A-N, such as a public key of each of the users 120A-N. The service provider server 240 may store the directory in the data store 245. At step 420, the service provider server 240 may receive an electronic document image delivery request from a sending user, such as the user A 120A, requesting to send an electronic document image to a receiving user, such as the user B 120B. The request may include the electronic document image to be delivered, and the user identifier of the receiving user, the user B 120B. For example, the user A 120A may use the device 220A to encrypt and communicate an electronic document image to the service provider server 240.

The delivery request may include one or more delivery variables, such as an expiration date/time. The expiration date/time may represent the latest date/time the electronic document image should be delivered to the user B 120B. In other words, if the service provider server 240 is unable to deliver the electronic document image to the user B 120B prior to the expiration date/time, the service provider server 240 may not deliver the electronic document image to the user B 120B. The service provider server 240 may notify the user A 120A if the electronic document image is unable to be delivered to the user B 120B prior to the expiration date/time.

Alternatively or in addition, the user A 120A may be required to authenticate with the service provider server 240 in order to communicate the delivery request. For example, the user A 120A may supply login credentials to the service provider server 240, such as a login and password, a biometric credential, a smart card, or generally any credential which may verify the identity of the user A 120A.

At step 430, the service provider server 240 may provide a request received confirmation to the user A 120A. The request received confirmation may include the electronic document image to be delivered and the user identifier of the user B 120B such that the user A 120A may verify that the electronic document image being sent, and the receiving user, are accurate. At step 435, the service provider server 240 may determine whether the receiving user, the user B 120B, is available. For example, the service provider server 240 may poll the device 220B of the user B 120B or may poll an online presence of the user B 120B to determine the availability of the user B 120B. Alternatively, the service provider server 240 may send a notification to the user B 120B indicating that an electronic document image is available to be delivered. The user B 120B may respond to the notification with an indication that they are available to receive the electronic document image. Alternatively, the user B 120B may configure the device 220B to automatically respond to availability requests from the service provider server 240.

If, at step 435, the service provider server 240 determines that the user B 120B is not available to receive the electronic document image, the service provider server 240 moves to step 440. At step 440, the service provider server 240 sends another notification to the user B 120B indicating that an electronic document image is available to be delivered to the user B 120B. The notification may be sent to the device 220B and/or the notification may be sent to an alternate device of the user B 120B, such as a mobile phone, a PDA, or generally any other device of the user B 120B. Alternatively or in addition, the notification may be sent through an email, a voicemail, an instant message, a text message, or generally any mode of communication capable of reaching the user B 120B. The user B 120B may configure how the notifications are transmitted.

If, at step 435, the service provider server 240 determines that the user B 120B is available to receive the electronic document image, the service provider server 240 moves to step 450. At step 450, the service provider server 240 may securely transmit the electronic document image to the user B 120B. The service provider server 240 may retrieve information for automatically routing the electronic document image to the user B 120B from the data store 245, such as an internet protocol (IP) address of the user B 120B. Alternatively or in addition, the user B 120B may authenticate with the service provider server 240 and request to receive the electronic document image through the device 220B. Upon successful authentication of the user B 120B, the service provider server 240 may provide the electronic document image to the user B 120B, such as through the device 220B.

At step 460, the service provider server 240 may receive a confirmation from the user B 120B indicating that the electronic document image was received. For example, the user B 120B may decrypt the electronic document image using their private key, may view the electronic document image, and may communicate the electronic document image delivered confirmation to the service provider server 240. The confirmation may include additional information related to the electronic document image, such as the quality of the electronic document image or any questions related to the content of the electronic document image. In one example, the electronic document image delivered confirmation may include the user identifier of the user B 120B and the actual electronic document image. At step 470, the service provider server 240 may transmit a delivery confirmation to the user A 120A, such as through the device 220A. The service provider server 240 may poll the device 220A and, if the device 220A indicates that the user A 120A is available, may automatically provide the confirmation to the device 220A. Alternatively or in addition, the service provider server 240 may send a notification to the user A 120A, such as through the device 220A, indicating that a communication is available to be retrieved. The user A 120A may then authenticate with the service provider server 240 and may retrieve the delivery confirmation from the service provider server 240.

Alternatively or in addition, if the quality of the electronic document image is unacceptable, the user B 120B may communicate an unacceptable quality notification to the service provider server 240. The unacceptable quality notification may include the identifier of the user B 120B and the electronic document image. The service provider server 240 may communicate an indication of the unacceptable quality notification to the user A 120A, such as through the device 220A. The user A 120A may attempt to re-send the electronic document image using a higher quality image of the original document.

Figure 5:
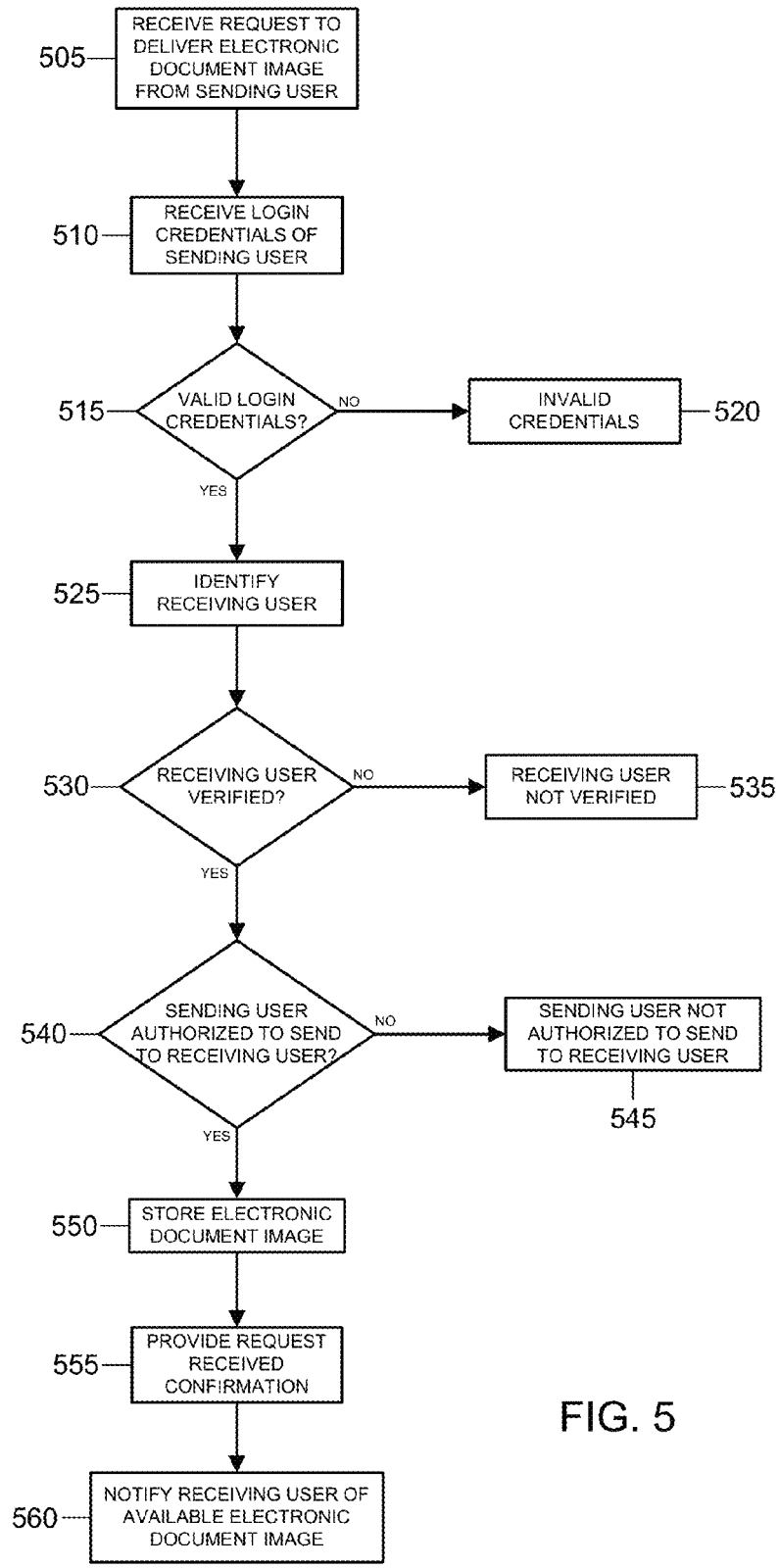
FIG. 5 is a flowchart illustrating an electronic document image delivery request operation in the systems of FIG. 1 and FIG. 2, or other systems for providing a managed virtual point to point communication service utilizing a verified directory, secure transmission, and controlled delivery.

FIG. 5 is a flowchart illustrating an electronic document image delivery request operation in the systems of FIG. 1 and FIG. 2, or other systems for providing a managed virtual point to point communication service utilizing a verified directory, secure transmission, and controlled delivery. The steps of FIG. 5 are described as being performed by the service provider server 240. However, the steps may be performed by the processor of the service provider server 240, or by any other hardware component of the service provider server 240. Alternatively the steps may be performed by an external hardware component, such as a hardware component in communication with the service provider server 240.

At step 505, the service provider server 240 may receive a request to deliver an electronic document image from a sending user, such as the user A 120A, to a receiving user, such as the user B 120B. The request may include the electronic document image to be delivered, and the identifier of the receiving user, the user B 120B. At step 510, the service provider server 240 may receive login credentials from the user A 120A. For example, the user A 120A may provide a login and password to the service provider server 240 through the device 220A. At step 515, the service provider server 240 determines whether the login credentials provided by the user A 120A are associated with a verified user in the verified directory. If, at step 515, the service provider server 240 determines that the credentials provided by the user A 120A are not associated with a verified user in the verified directory, and are therefore invalid, the service provider server 240 moves to step 520. At step 520, the service provider server 240 notifies the user A 120A that the login credentials are invalid.

If, at step 515, the service provider server 240 determines that the login credentials provided by the user A 120A are associated with a verified user in the verified directory, and are therefore valid, the service provider server 240 moves to step 525. At step 525, the service provider server 240 may identify the receiving user of the electronic document image, the user B 120B. For example, the service provider server 240 may retrieve information from the data store 245 associated with the identifier of the user B 120B. At step 530, the service provider server 240 may verify that the user B 120B is a verified user in the verified directory. If, at step 530, the service provider server 240 determines that the user B 120B is not a verified user in the verified directory, the service provider server 240 moves to step 535. At step 535, the service provider server 240 may notify the user A 120A that the user B 120B is not a verified user in the verified directory and therefore cannot receive electronic document images through the service.

If, at step 530, the service provider server 240 determines that the user B 120B is a verified user in the verified directory, the service provider server 240 moves to step 540. At step 540, the service provider server 240 may determine whether the user A 120A is authorized to send an electronic document image to the user B 120B. For example the information retrieved from the data store 235 may include access control information which indicates which users 120A-N are allowed to send electronic document images to the user B 120B.

Alternatively, the user A 120A may only have access to the user identifiers of the users 120B-N in the verified directory who have authorized the user A 120A to send them electronic document images. Alternatively, there may be no access restrictions on which users 120B-N the user A 120A can send electronic document images to. In this instance, the service provider server 240 may not need to determine whether the user A 120A is authorized to send an electronic document image to the user B 120B, and therefore the service provider server 240 may skip step 550.

If, at step 540, the service provider server 240 determines that the user A 120A is not authorized to send electronic document images to the user B 120B, the service provider server 240 moves to step 545. At step 545, the service provider server 240 provides a notification to the user A 120A indicating that the user A 120A is not authorized to send electronic document images to the user B 120B. The user A 120A may communicate an authorization request to the service provider server 240, which requests authorization to send electronic document images to the user B 120B. The service provider server 240 may transmit the authorization request to the user B 120B. Alternatively or in addition, if the user A 120A is not authorized to send electronic document images to the user B 120B, the service provider server 240 may automatically send an authorization request to the user B 120B. If the user B 120B approves the authorization request, the service provider server 240 may move to step 550.

If, at step 540, the service provider server 240 determines that the user A 120A is authorized to send the electronic document image to the user B 120B, the service provider server 240 moves to step 550. At step 550, the service provider server 240 may store the electronic document image, and the user identifier of the receiving user, the user B 120B, in the data store 245. The service provider server 240 may also store additional information related to the transaction with the user A 120A, such as the identifier of the user A 120A, a timestamp of the date/time when the electronic document image was received, or generally any other information describing the transaction. At step 555, the service provider server 240 may communicate a request received confirmation to the user A 120A. The request received confirmation may include the electronic document image and the identifier of the user B 120B. Alternatively or in addition, if an expiration date/time is associated with the delivery request, the request confirmation may include an acknowledgement of the expiration date/time.

At step 560, the service provider server 240 may notify the user B 120B, that an electronic document image is available to be delivered, such as by transmitting a notification to the device 220B. Alternatively or in addition, the service provider server 240 may notify the user B 120B of the electronic document image to be received through other modes of communication, such as email, voicemail, instant messaging, or generally any other mode of communication. The user B 120B may supply contact information for each mode of communication when the user B 120B registers for the service. Alternatively or in addition, the service provider server 240 may provide a user interface to the users 120A-N, which allows the users 120A-N to configure how and when notifications are sent to them.

Figure 6:
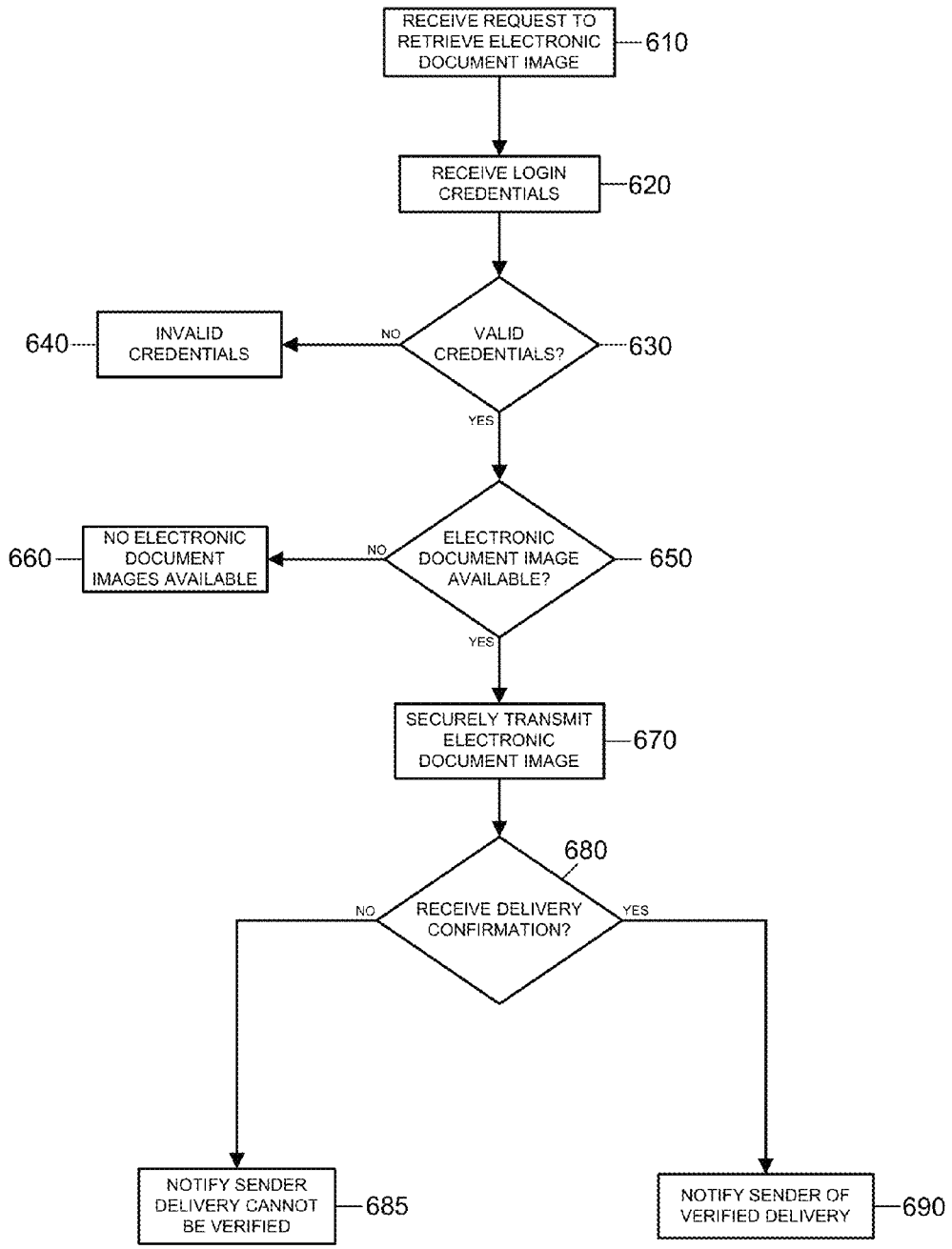
FIG. 6 is a flowchart illustrating an electronic document image retrieval operation in the systems of FIG. 1 and FIG. 2, or other systems for providing a managed virtual point to point communication service utilizing a verified directory, secure transmission, and controlled delivery.

FIG. 6 is a flowchart illustrating a retrieve electronic document image operation in the systems of FIG. 1 and FIG. 2, or other systems for providing a managed virtual point to point communication service utilizing a verified directory, secure transmission, and controlled delivery. The steps of FIG. 6 are described as being performed by the service provider server 240. However, the steps may be performed by the processor of the service provider server 240, or by any other hardware component of the service provider server 240. Alternatively the steps may be performed by an external hardware component, such as a hardware component in communication with the service provider server 240.

At step 610, the service provider server 240 may receive a request to retrieve an electronic document image from a receiving user, such as the user B 120B. For example, the service provider server 240 may receive an electronic document image from a user A 120A to be delivered to the user B 120B. The service provider server 240 may send a notification to the user B 120B that the electronic document image is available to be retrieved. Upon receiving the notification from the service provider server 240, the user B 120B may request to receive the electronic document image from the service provider server 240. At step 620, the service provider server 240 may receive login credentials from the user B 120B. For example, the user B 120B may provide a login and password to the service provider server 240 through the device 220B. At step 630, the service provider server 240 determines whether the login credentials provided by the user B 120B are associated with a verified user in the verified directory. If, at step 630, the service provider server 240 determines that the credentials provided by the user B 120B are not associate with a verified user in the verified directory, and are therefore invalid, the service provider server 240 moves to step 640. At step 640, the service provider server 240 notifies the user B 120B that the login credentials are invalid.

If, at step 630, the service provider server 240 determines that the login credentials provided by the user B 120B are valid, the service provider server 240 moves to step 650. At step 650, the service provider server 240 determines whether an electronic document image is available to be securely transmitted to the user B 120B. If, at step 650, the service provider server 240 determines that there are no electronic document images to be securely delivered to the user B 120B, the service provider server 240 moves to step 660. At step 660, the service provider server 240 notifies the user B 120B that there are currently no electronic document images available to be securely transmitted to the user B 120B.

If, at step 650, the service provider server 240 determines that there is an electronic document image available to be securely transmitted to the user B 120B, the service provider server 240 moves to step 670. At step 670, the service provider server 240 securely transmits the electronic document image to the user B 120B, such as through the device 220B. At step 680, the service provider server 240 determines whether the user B 120B provided a delivery confirmation to the service provider server 240, such as through the device 220B. For example, the user B 120B may view the electronic document image and transmit a delivery confirmation to the service provider server 240 through the device 220B. Alternatively or in addition, the user B 120B may respond with an error confirmation, which indicates a problem with the received electronic document image, such as the received electronic document image was not properly received. Alternatively or in addition, the service provider server 240 may wait for a period of time, such as five minutes, to receive a delivery confirmation from the user B 120B. If the service provider server 240 does not receive a confirmation within the period of time, the service provider server 240 may determine that the electronic document image was not delivered properly.

If, at step 680, the service provider server 240 determines that a delivery confirmation was not received, the service provider server 240 moves to step 685. At step 685, the service provider server 240 may notify the user A 120A that the delivery of the electronic document image could not be verified. If the user B 120B provided an error confirmation, or any other information indicating a problem with the electronic document image, the service provider server 240 may provide the information to the user A 120A.

If, at step 680, the service provider server 240 determines that a delivery confirmation was received from the user B 120B, the service provider server 240 moves to step 690. At step 690, the service provider server 240 may provide a delivery confirmation to the sending user, such as the user A 120A. The delivery confirmation may verify that the electronic document image was received by the intended recipient, the user B 120B.

Figure 7:
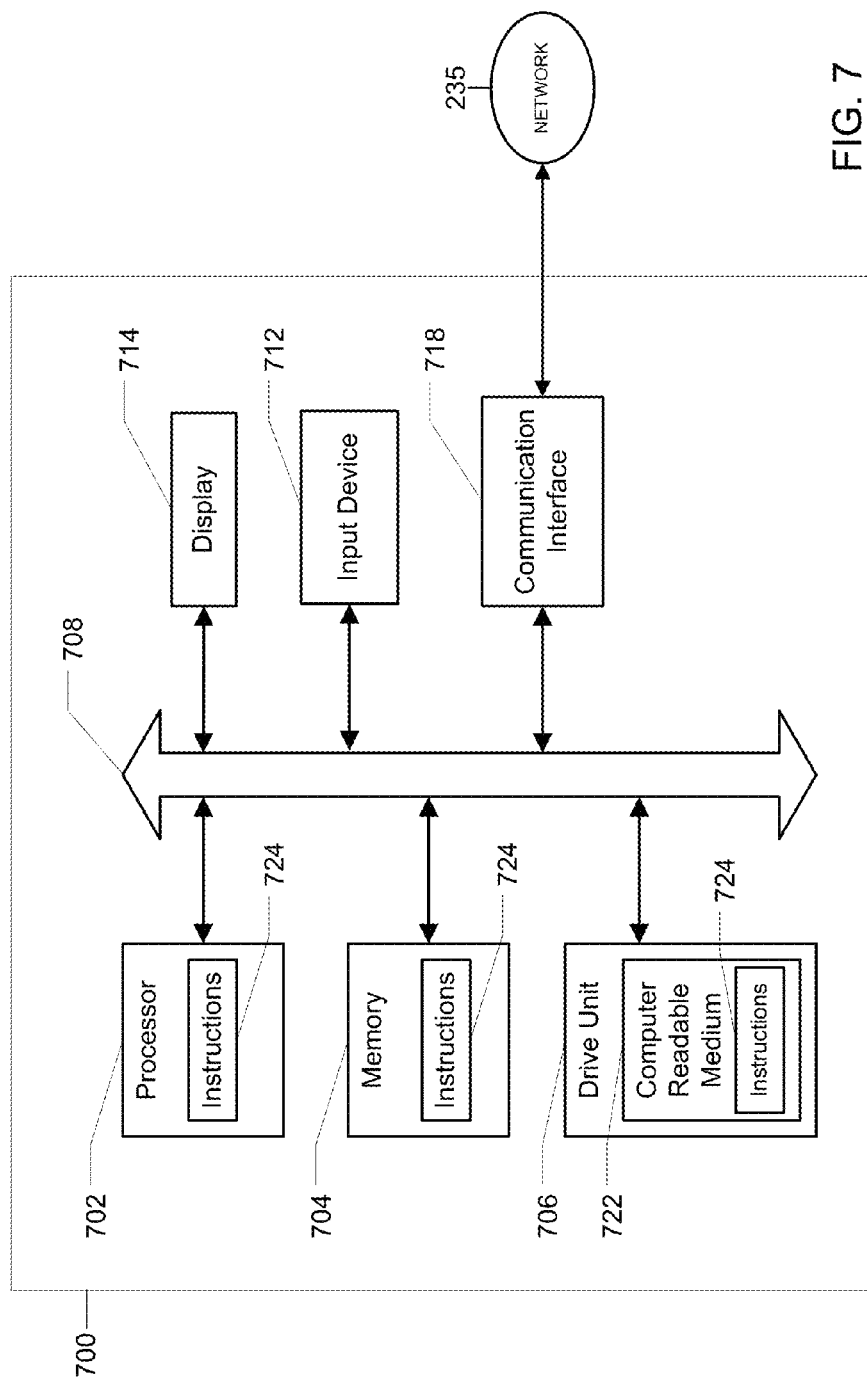
FIG. 7 is an illustration of a general computer system that may be used in the systems of FIG. 2, or other systems for providing a managed virtual point to point communication service utilizing a verified directory, secure transmission, and controlled delivery.

FIG. 7 illustrates a general computer system 700, which may represent a service provider server 240, the devices 220A-N, the computing device 225, or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices. In the case of the devices 220A-N, the computer system 700 may further include a scanning device which may be integrated into the computer system 700, or may be in communication with the computer system 700. The scanning device may be capable of generating a digital image of a document and communicating the digital image to the processor 702.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a fax machine, a printer, a pager, a personal trusted device, a web appliance, a network router, switch or bridge, or any other machine capable of executing a set of instructions 724 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706. The display 714 may be touch sensitive, such that the display 714 may receive input from a user.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server 240, the service provider server 240 may communicate with users 120A-N through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer implemented method of communicating document images between verified users, the method comprising:

providing, by a processor, a secure transmission of an electronic document image via a network coupled with the processor from a sending user to a receiving user, both the sending user and receiving user being listed in a directory of a plurality of users, the providing further comprising:

identifying, by the processor prior to transmitting the electronic document image, one or more devices coupled with the network and authorized to receive transmissions of electronic document images intended for the receiving user;

verifying, by the processor, the presence of the receiving user at a particular device of the one or more devices coupled with the network by sending, by the processor via the network, a notification of the transmission of the electronic document image to the particular device and receiving, by the processor, a response to the notification indicating that the receiving user is available to receive the electronic document image;

securely transmitting, by the processor only in response to the receipt of the response indicating that the receiving user is available to receive the electronic document image, the electronic document image to the receiving user via the network; and determining the electronic document was securely accessed by the receiving user based on receipt of a confirmation from the receiving user, wherein the confirmation indicates the receiving user accessed the electronic document image.

2. The method of claim 1, wherein the secure transmission further comprises:

receiving a request from the sending user comprising a replacement electronic document image;

replacing the electronic document image with the replacement electronic document image if the electronic document image has not been securely accessed by the receiving user such that the receiving user is provided secure access to the replacement electronic document image in lieu of the electronic document image; and providing a replacement confirmation to the sending user when the electronic document image was replaced with the replacement electronic document image.

3. The method of claim 1, further comprising providing a delivery confirmation to the sending user of the plurality of users, wherein the delivery confirmation indicates that the electronic document image was securely transmitted to the receiving user.

4. The method of claim 1, wherein the transmission further comprises an expiration date/time, wherein the expiration date/time indicates a latest date/time that secure access to the electronic document image is to be provided to the receiving user.

5. The method of claim 4, wherein the secure transmission further comprises:

providing a failure notification to the sending user if the current date/time exceeds the expiration date/time and the electronic document image has not been securely accessed to the receiving user.

6. The method of claim 1, wherein the secure transmission further comprises:

providing a request received confirmation to the sending user, upon receiving a request to deliver the electronic document image from the sending user, wherein the request received confirmation indicates that the request was received.

7. The method of claim 1, wherein a confirmation received from the receiving user indicates that the electronic document image was securely accessed having an acceptable quality.

8. The method of claim 1, wherein the secure transmission further comprises:

transforming the electronic document image into a transformed electronic document image; and providing secure access to the transformed electronic document image to the receiving user.

9. The method of claim 8, wherein the transformed electronic image comprises at least one of an audio waveform or machine-editable text.

10. A non-transitory computer readable medium including instructions for providing a secure transmission of an electronic document image from a sending user to a receiving user via a network, both the sending user and receiving user being listed in a directory of a plurality of users, the instructions configured such that when executed by at least one processor coupled with the network the instructions are operable to cause a system to:

identify, prior to transmission of the electronic document image, one or more devices coupled with the network authorized to receive transmissions of electronic document images intended for the receiving user;

verify the presence of the receiving user at a particular device of the one or more devices by sending, via the network, a notification of the transmission of the electronic document image to the particular device and receiving, via the network, a response to the notification indicating that the receiving user is available to receive the electronic document image;

securely transmit, only in response to the receipt of the response indicating that the receiving user is available to receive the electronic document image, the electronic document image to the receiving user via the network; and determine that the electronic document was securely accessed by the receiving user based on receipt of a confirmation from the receiving user, wherein the confirmation indicates the receiving user accessed the electronic document image.

11. The medium of claim 10, wherein the instructions are further configured to:

receive a request from the sending user comprising a replacement electronic document image;

replace the electronic document image with the replacement electronic document image if the electronic document image has not been securely accessed by the receiving user such that the receiving user is provided secure access to the replacement electronic document image in lieu of the electronic document image; and provide a replacement confirmation to the sending user when the electronic document image was replaced with the replacement electronic document image.

12. The medium of claim 10, wherein the instructions are further configured to provide a delivery confirmation to the sending user of the plurality of users, wherein the delivery confirmation indicates that the electronic document image was securely transmitted to the receiving user.

13. The medium of claim 10, wherein the transmission further comprises an expiration date/time, wherein the expiration date/time indicates a latest date/time that secure access to the electronic document image is to be provided to the receiving user.

14. The medium of claim 13, wherein the instructions are further configured to:

provide a failure notification to the sending user if the current date/time exceeds the expiration date/time and the electronic document image has not been securely accessed to the receiving user.

15. The medium of claim 10, wherein the instructions are further configured to:

provide a request received confirmation to the sending user, upon receiving a request to deliver the electronic document image from the sending user, wherein the request received confirmation indicates that the request was received.

16. The medium of claim 10, wherein the instructions are further configured to:
receive a confirmation from the receiving user that indicates that the electronic document image was securely accessed having an acceptable quality.

17. A system for securely communicating electronic document images between verified users of a directory of a plurality of users via a network, the system comprising:
a memory operable to store data indicative of an electronic document image; and
a processor coupled with the memory and the network and configured to:
identify, prior to transmission of the electronic document image, one or more devices coupled with the network authorized to receive transmissions of electronic document images intended for the receiving user;
verify the presence of the receiving user at a particular device of the one or more devices by sending, via the network, a notification of the transmission of the electronic document image to the particular device and receiving, via the network, a response to the notification indicating that the receiving user is available to receive the electronic document image;
securely transmit, only in response to the receipt of the response indicating that the receiving user is available to receive the electronic document image, the electronic document image to the receiving user via the network; and
determine that the electronic document was securely accessed by the receiving user based on receipt of a confirmation from the receiving user, wherein the confirmation indicates the receiving user accessed the electronic document image.

18. The system of claim 17, wherein the processor is further configured to:
transform the electronic document image into a transformed electronic document image; and
providing secure access to the transformed electronic document image to the receiving user.

19. The method of claim 17, wherein the transformed electronic image comprises at least one of an audio waveform or machine-editable text.

\* \* \* \* \*